United States Patent
Lehnst et al.

(10) Patent No.: US 6,820,631 B2
(45) Date of Patent: Nov. 23, 2004

(54) METHOD FOR THE CONTINUOUS CONTROL OF A POSITION OF A CONTROL VALVE

(75) Inventors: Reinhard Lehnst, Muelheim A.D. Ruhr (DE); Rudolf Schlehuber, Oberhausen (DE); Gerta Zimmer, Muelheim A.D. Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 47 days.

(21) Appl. No.: 10/301,709

(22) Filed: Nov. 22, 2002

(65) Prior Publication Data

US 2003/0098070 A1 May 29, 2003

(30) Foreign Application Priority Data

Nov. 23, 2001 (EP) .............................. 01127945

(51) Int. Cl.⁷ ........................... G05D 16/20; F16K 31/02
(52) U.S. Cl. ........................... 137/2; 137/12; 137/487.5; 251/129.04; 700/282
(58) Field of Search ........................... 137/1, 2, 12, 14, 137/486, 487, 487.5; 251/129.04; 700/282, 289

(56) References Cited

U.S. PATENT DOCUMENTS

| | | | | |
|---|---|---|---|---|
| 4,090,065 A | * | 5/1978 | Braytenbah et al. | 700/290 |
| 4,178,762 A | * | 12/1979 | Binstock et al. | 60/667 |
| 4,554,788 A | * | 11/1985 | Hwang et al. | 60/646 |
| 4,556,956 A | * | 12/1985 | Dickenson et al. | 700/42 |
| 4,694,390 A | * | 9/1987 | Lee | 700/45 |
| 4,791,954 A | * | 12/1988 | Hasegawa | 137/487.5 |
| 5,109,675 A | * | 5/1992 | Hwang | 60/660 |
| 5,251,148 A | * | 10/1993 | Haines et al. | 700/282 |
| 5,388,607 A | * | 2/1995 | Ramaker et al. | 137/88 |
| 5,950,668 A | * | 9/1999 | Baumann | 137/487.5 |
| 6,138,564 A | * | 10/2000 | Eckardt et al. | 101/228 |
| 6,142,163 A | | 11/2000 | McMillin | |
| 6,155,283 A | * | 12/2000 | Hansen et al. | 137/1 |
| 6,178,997 B1 | | 1/2001 | Adams | |
| 6,217,506 B1 | * | 4/2001 | Phillips et al. | 600/19 |
| 6,272,401 B1 | * | 8/2001 | Boger et al. | 700/282 |
| 6,480,750 B2 | * | 11/2002 | Junk | 700/34 |
| 6,512,960 B1 | * | 1/2003 | Schulz | 700/56 |

FOREIGN PATENT DOCUMENTS

| | | |
|---|---|---|
| EP | 0 957 418 | 7/1994 |
| GB | 1028345 | 1/1963 |

OTHER PUBLICATIONS

Jan Lunze, Regelungstechnik 2, Springer, p. 70–111.

* cited by examiner

Primary Examiner—Ramesh Krishnamurthy
(74) Attorney, Agent, or Firm—Harness, Dickey & Pierce, P.L.C.

(57) ABSTRACT

A method is for the continuous control of a position of a control valve. A control deviation from a position of the control valve, is determined as a controlled variable, in relation to a reference variable being determined. A manipulated variable is determined from the control deviation, by which manipulated variable the control valve is positioned and/or maintained in the position predefined by the reference variable. The improved method for the control of the position of a control valve, has the effect that failure of a valve position transmitter does not result in failure of the position control loop.

14 Claims, 3 Drawing Sheets

METHOD FOR THE CONTINUOUS CONTROL OF A POSITION OF A CONTROL VALVE

The present application hereby claims priority under 35 U.S.C. §119 on European patent application No. 01127945.2 filed Nov. 23, 2001, the entire contents of which are hereby incorporated herein by reference.

FIELD OF THE INVENTION

The invention generally relates to a method for the continuous control of a position of a control valve. In particular, it preferably relates to a control valve as part of a closed-loop or open-loop process control system. A control deviation from a position of the control valve, is determined as a controlled variable, in relation to a reference variable being determined. A manipulated variable is determined from the control deviation, by which manipulated variable the control valve is positioned and/or maintained in the position predefined by the reference variable.

BACKGROUND OF THE INVENTION

Processes for the production of power from steam by use of turbines are known from the prior art. In these processes, the steam is led from an intermediate superheater to a turbine set, for example comprising a medium pressure turbine with low pressure turbines connected downstream. The turbines are arranged on a common shaft. In order to be able to operate the turbines in a defined or optimum operating state, bypass control valves with a position control system are provided in parallel with the turbine set. Control valves of this type generally have an electrohydraulic drive.

The position control system positions the control valve in accordance with a set point (reference variable) predefined by a control system. An actual value (registered controlled variable) required for this control system is provided by a valve position transmitter with an analog travel measurement converter.

A control difference between the actual value and the set point is associated with a control value (manipulated variable) in accordance with a predefined control characteristic. With this control value, the control valve is positioned in the predefined position by the electrohydraulic drive.

In the case of long connected pipelines, a tendency toward oscillation is manifested by the system, corresponding oscillatory loadings occurring on the valves. In the case of a valve position transmitter arranged in a control valve, this leads to high mechanical stress, which is accompanied by a high failure rate in the valve position transmitter affected. In current control designs, failure of the value position transmitter leads to the bypass control valve being closed, and therefore to failure of the position control loop.

SUMMARY OF THE INVENTION

An embodiment of the invention may be based on an object of improving a known method for the control of the position of a valve, with the effect that failure of a valve position transmitter does not result in failure of the position control loop.

To this end, an embodiment of the invention proposes that the controlled variable corresponding to the position of the control valve is determined by observing the manipulated variable and at least one further variable that can be influenced by the position of the control valve.

Here, "observing" is to be understood to mean a control engineering definition in which a system is called completely observable when the initial state of a system can be determined from the course of the input variable over a finite interval and the output variable (see Jan Lunze, Regelungstechnik 2, [Control Engineering 2], Definition 3.2 or else Otto Föllinger, Regelungstechnik, [Control Engineering], $5^{th}$ Edition, Definition 11.109).

It is also advantageously possible to dispense completely with a valve position transmitter for the control valve. Components and costs can be reduced or avoided, in particular including those for service and maintenance. With the solution according to an embodiment of the invention, a high degree of accuracy and reliability can be achieved. Furthermore, for example in the event of retrofitting in a plant, the observer can optionally be used in parallel with a valve position transmitter. In the event of malfunction of the valve position transmitter, the controlled variable required for the control system can be determined by observation, irrespective of the function of the valve position transmitter. A high degree of reliability and accuracy can be achieved. The solution according to an embodiment of the invention can be used in principle in control loops, it being possible for a valve position set point either to be fixedly predefined as a reference variable or else provided by a higher-order control loop, for example a pressure control loop.

Furthermore, it is proposed that the controlled variable corresponding to the position of the control valve be determined by observing the controlled variable and a pressure in each case registered upstream and downstream of the control valve. Measurement points which are already present and required in any case for the open-loop or closed-loop control of the process can advantageously be used in order to determine the controlled variable.

In addition, it is proposed that the reference variable may be predefined by a higher-order control system, for example a pressure control system. For example, a valve position can be predefined by a higher-order control system, achievement and maintenance of the predefined position being effected by a control system that is otherwise independent. In particular in the case of large industrial plants, this can make it possible, by means of a control system arranged locally, to reach and/or to maintain a valve position predefined from a remote central station quickly and with little interference. Furthermore, it is proposed that the control system advantageously have a proportional behavior.

In addition, it is proposed that the determined position of the control valve be indicated. The observed measured value of the valve position can be indicated without a further measuring device being required. The measured value can also be transmitted to a higher-order control system or to a central station.

A mass flow is advantageously proportional to the respective pressure. Furthermore, it is proposed that there be a supercritical pressure drop across the control valve.

In order to obtain an explicitly known valve manipulated variable which, in one form, has an effect on the resultant valve movement which does not depend on the current valve stroke, it is proposed that a control system be affine.

It is further proposed that a value of the reference variable (4) lie in a range from approximately −10% to 110%. The end positions of the control valve can advantageously be moved to in a defined manner.

In order to create possible ways of intervening in the control, the manipulated variable may be led to a selection switch. This makes it possible for the control valve to have a predefined control value applied to it, for example for test purposes. Via the selection switch, the manipulated variable can be switched to a maximum or to a minimum value, in order for example to determine the maximum and/or minimum stroke.

Furthermore, the controlled variable used optionally may also be a registered measured value from a valve position transmitter. Thus, for example for testing purposes, it is possible to select between direct and observed determination of the valve position.

Furthermore, it is proposed that a measured value from the valve position transmitter may be used to calibrate the observer, as it is known, the device which determines the position of the control valve by observing the aforementioned variables. A directly measured valve position can advantageously be used to set the observer with its parameters, so that a deviation in relation to the control by use of a valve position transmitter becomes as small as possible in an operating state which is beneficial for the valve position transmitter.

It is also proposed that the control valve be positioned and/or maintained by an electrohydraulic drive in the position predefined by the reference variable. Control valves can advantageously be used for high requirements. Control characteristics of the system comprising control valve and electrohydraulic drive can be taken into account in the control characteristic, so that fast, stable control can be carried out, avoiding the faults produced, for example, by oscillations or else corrosion.

Further details, features and advantages of the invention can be gathered from the following description of an exemplary embodiment. Substantially constant components are designated by the same designations. Furthermore, with regard to identical features and functions, reference is made to the description of the exemplary embodiment in FIG. 1.

DETAILED DESCRIPTION OF THE PREFERRED EMBODIMENTS

Figure 1:
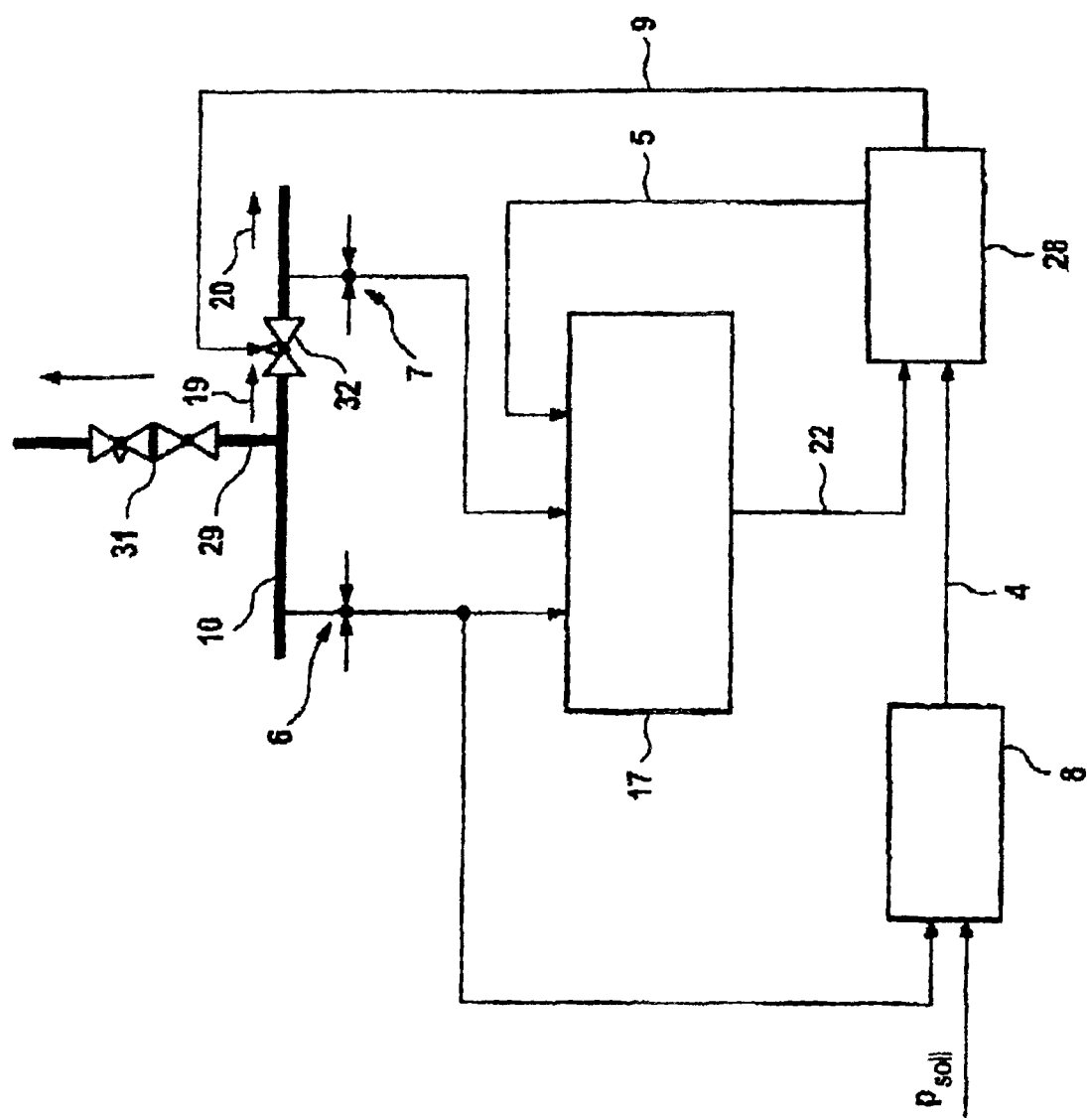
FIG. 1 shows a detail of a plant schematic drawing relating to the control of a turbine set.

FIG. 1 represents a detail from a plant schematic drawing of a plant producing power from steam. On a line 10, a gaseous stream of steam is led to valves 31, 32 via a branch 29.

Furthermore, FIG. 1 shows an observer 17, which is connected to a pressure measurement point 6 arranged upstream of the control valves 31, 32 in the flow direction and to a pressure measurement point 7 arranged downstream of the control valve 32 in the flow direction. The mass flow is proportional to the respective pressure difference, there being a supercritical pressure drop across the control valve 32. Furthermore, the observer 17 obtains the manipulated variable 5 from a position controller 28 as an input signal.

Figure 2:
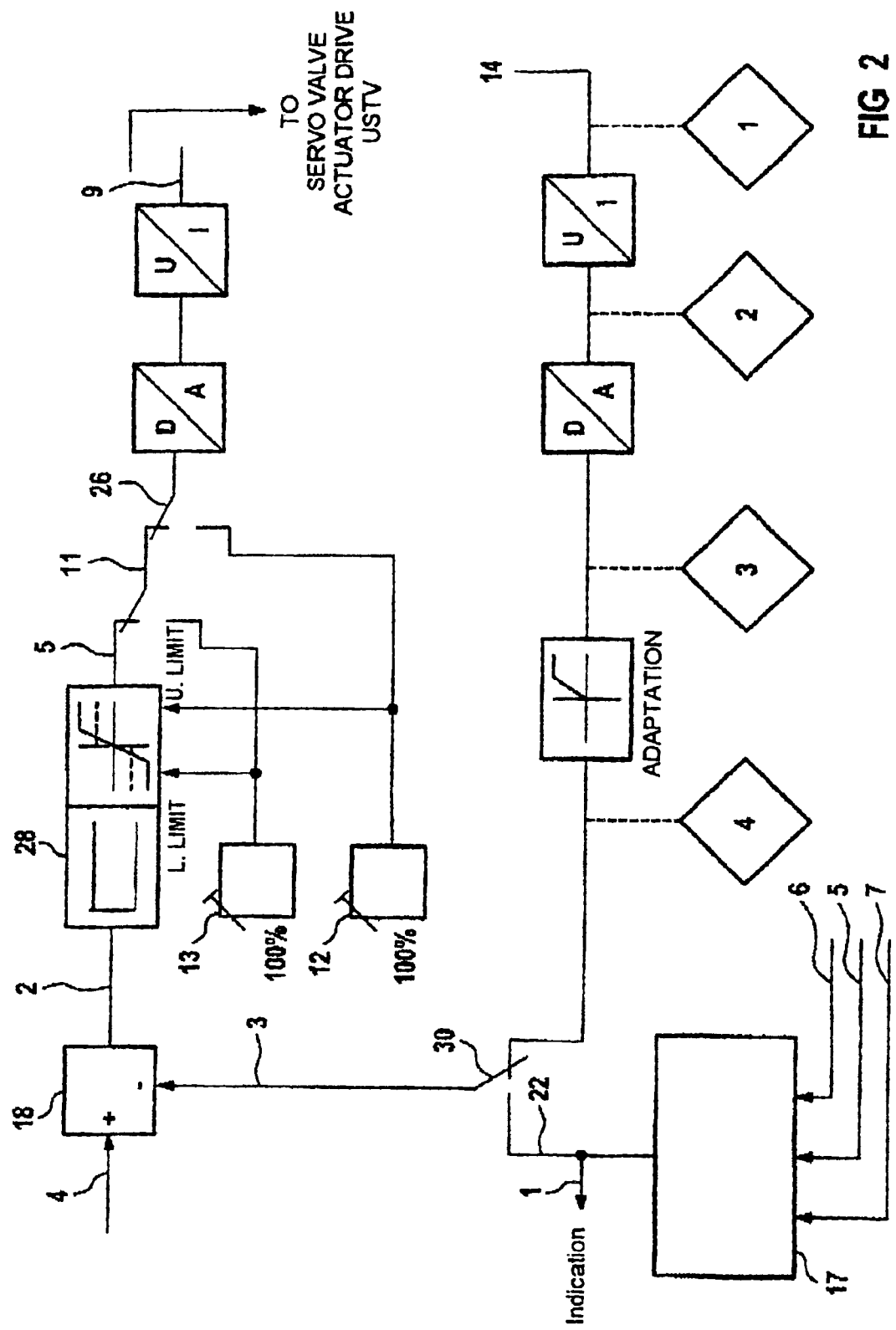
FIG. 2 shows a block diagram for a control system of a control valve with an observer according to an embodiment of the invention.

From these three input variables, the observer 17 determines the actual value 22 of the valve position of the control valve 32. The signal is provided to a position controller 28, which determines the control deviation 2 from a reference variable 4, from which the position controller 28 generates the manipulated variable 5 for the control valve 32. The reference variable 4 can assume values between −10% and 110%, in order to make it possible to move in a defined manner to the end positions of the control valve 32. Via the selection switch 30, the actual value 14 supplied by a valve position transmitter, not specifically illustrated, can also be selected for the control system (FIG. 2). The control system provided is an affine control system.

FIG. 2 shows a block diagram for a method for the continuous control of a position of the control valve 32 as part of a process control system. A comparator 18 determines a control deviation 2 from a position of the control valve 32 determined as controlled variable 3 in relation to the reference variable 4. This is done using the control deviation 2 to determine a manipulated variable 5. By this, the control valve 32 is positioned and/or maintained in the position predefined by the reference variable 4.

According to an embodiment of the invention, the controlled variable 3 corresponding to the position of the control valve 32 is determined by observing the manipulated variable 5 and two further variables 6, 7 that are affected by the position of the control valve 32 and which, in this configuration, are formed by a pressure 6, 7 registered respectively upstream and downstream of the control valve 32.

The reference variable 4 is predefined by a higher-order pressure control system 8. The position controller 28 is characterized by a proportional behaviour. The determined position of the control valve 32 is indicated via an indicating signal 1 from an indicator, not specifically illustrated. Furthermore, a manipulated variable 9 is produced in order to control a coil of an electrohydraulic drive, not specifically illustrated, belonging to the control valve 32.

The manipulated variable 5 is led to a selection switch 11 in which, optionally, the lower limiting value 13 can be selected as the manipulated variable. Following this, a changeover switch 26 is provided, with which, optionally, the upper limiting value 12 can be selected as the manipulated variable.

In relation to the observer 17, its basic function should be discussed briefly again at this point. The pressures 6, 7 upstream and downstream of the control valve 32, and also its manipulated variable 5, as an input variable in the form of an electrical voltage, are viewed as known, since they are available as a result of measurement. From the variations over time, it is possible for the initial state, here the signal 22 for the position of the control valve 32, to be determined (in this regard, see in particular Jan Lunze).

In detail, the valve position is determined as manipulated variable 5 with the aid of the observer 17 by using the pressures 6, 7 measured upstream and downstream of the control valve 32 and the voltage 9 corresponding to the valve position. In this configuration, the change in position of the control valve 32 is proportional to the applied voltage 9. In addition, however, a design is also conceivable in which the position of the control valve 32 is itself proportional to the applied voltage 9.

Figure 3:
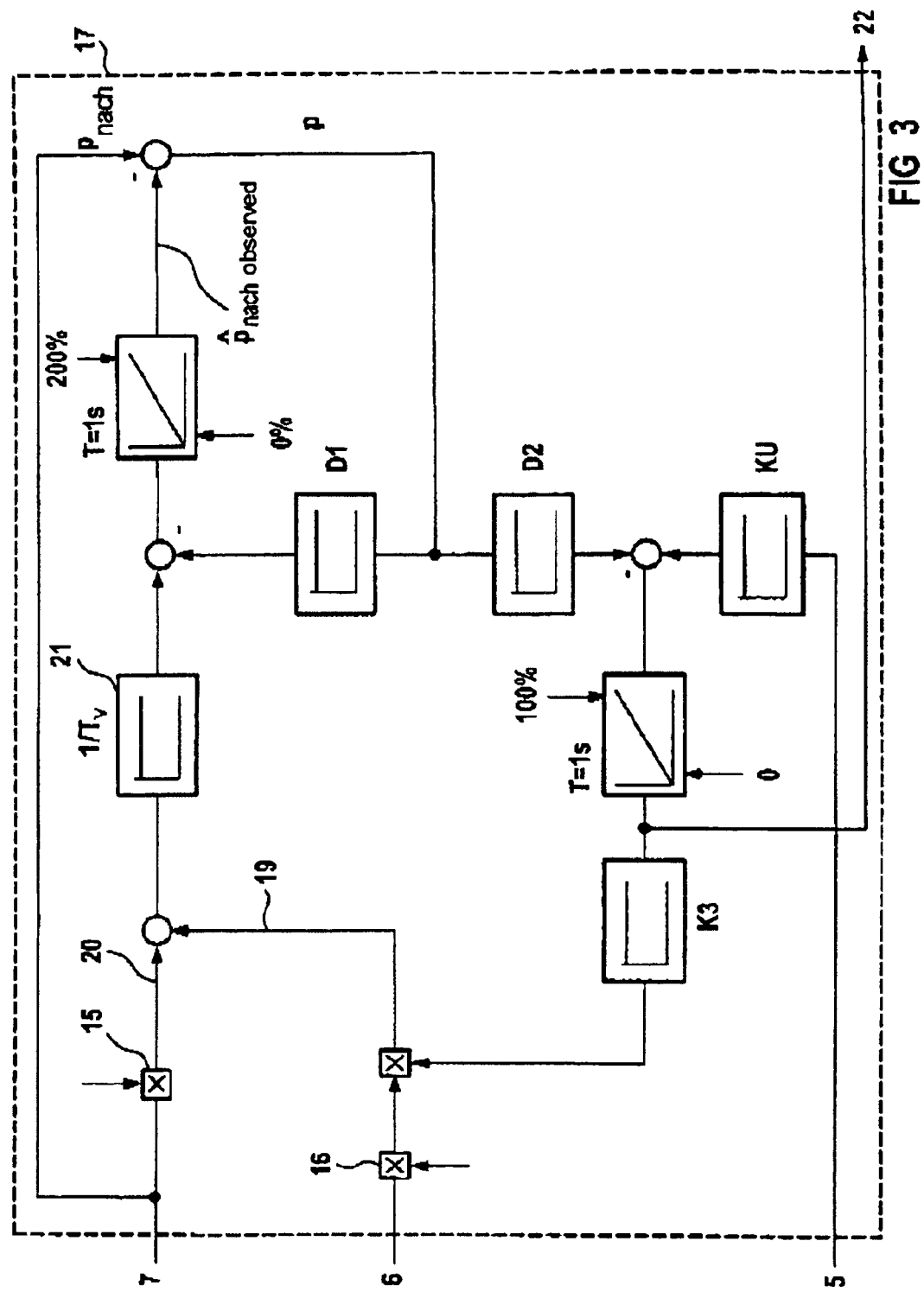
FIG. 3 shows a block diagram for the observer according to an embodiment of the invention.

The pressure 7 downstream of the control valve 32 depends on the steam mass flows 19, 20 flowing in and out (FIG. 3). The pressure change is proportional to the difference between the mass flows 19, 20 via the volume-dependent storage time constant 21. Under the assumption of a supercritical pressure drop, the mass of steam 19 flowing into the space downstream of the control valve 32 is proportional to the product of the valve position and the pressure 6 upstream of the control valve 32. The mass of steam 20 flowing out is primarily proportional to the pressure 7 built up in the storage space formed by the pipeline but not specifically illustrated. This is depicted by way of the multipliers 15, 16.

The system to be represented here may be depicted by use of a differential equation system having coupled differential equations.

$$\frac{d}{dt}\begin{pmatrix} h_v \\ p_{nach} \end{pmatrix} = \frac{1}{T_v}\begin{pmatrix} 0 & 0 \\ K_1 p_{vor} & -K_2 \end{pmatrix}\begin{pmatrix} h_v \\ p_{nach} \end{pmatrix} + \begin{pmatrix} K_u \\ 0 \end{pmatrix}U_v$$

$h_v$=valve position
$P_{nach}$=pressure built up downstream of the control valve
$T_v$=volume time constant
$K_{U,1,2}$=parameter
$P_{vor}$=pressure upstream of the control valve
$U_v$=voltage on the control valve (manipulated variable)

The dynamic of the system equations is simulated by the observer 17. In addition to the equations relating to the original system, the observer 17 receives feedback relating to the difference between the measured and observed pressure 7. The observer 17 is described by the equations $$\frac{d}{dt}\begin{pmatrix} h'_v \\ p'_{nach} \end{pmatrix} =$$

$$\frac{1}{T_v}\begin{pmatrix} 0 & 0 \\ K_1 p_{vor} & -K_2 \end{pmatrix}\begin{pmatrix} h'_v \\ p'_{nach} \end{pmatrix} + \begin{pmatrix} K_u \\ 0 \end{pmatrix}U_v + \begin{pmatrix} d_1 \\ d_2 \end{pmatrix}(p_{nach} - p'_{nach})$$

The dashed variables are observer states. The parameters $d_1$ and $d_2$ have to be chosen in such a way that the differential equation for the error $$\begin{pmatrix} \Delta h \\ \Delta p \end{pmatrix} = \begin{pmatrix} h_v \\ p_{nach} \end{pmatrix} - \begin{pmatrix} h'_v \\ p'_{nach} \end{pmatrix}$$

is stable at the origin (0, 0). This results in the differential equation system $$\frac{d}{dt}\begin{pmatrix} \Delta h \\ \Delta p \end{pmatrix} = \begin{pmatrix} 0 & -d_1 \\ \frac{K_1 p_{vor}}{T_v} & -\frac{K_2}{T_v} - d_2 \end{pmatrix}\begin{pmatrix} \Delta h \\ \Delta p \end{pmatrix}$$

which is stable if the associated characteristic polynomial exhibits only complex zeros with a real part less than zero. The result for the parameters $d_1$ and $d_2$ is:

$d_2 > K_2/T_v$ and $d_1 > 0$.

For the parameters, the following values are specified in this exemplary embodiment:
$K_1$=2.3
$K_2$=4.55
$K_3$=0.01
$T_v$=0.1
$d_1$=1
$d$=0.02
$K_u$=0.5 (first setting).

The exemplary embodiments shown in the figures serve merely to explain the invention and are not restrictive on the latter. For example, individual method steps, such as the selection of the variable that can be influenced by the position of the control valve, for example mass flow, and also the additional functions such as changing over the manipulated variables, and so on, can vary.

List of Designations
1 Indicator signal
2 Control deviation
3 Controlled variable
4 Reference variable
5 Manipulated variable
6 Pressure upstream of the valve
7 Pressure downstream of the valve
8 Higher-order control system
9 Current servo valve
10 Line
11 Selection switch
12 Maximum value
13 Minimum value
14 Actual value from the valve position transmitter
15 Multiplier
16 Multiplier
17 Observer
18 Comparator
19 Steam mass flow flowing in
20 Steam mass flow flowing out
21 Volume-dependent storage time constant
22 Observed actual value
26 Changeover switch
28 Position controller
29 Branch
30 Changeover switch
31 Control valve
32 Control valve

What is claimed is:

1. A method for the continuous control of a position of a control valve, comprising:
   determining a control deviation from a position of the control valve, as a controlled variable, in relation to a reference variable; and
   determining a manipulated variable from the control deviation, by which manipulated variable the control valve is at least one of positioned and maintained in the position predefined by the reference variable,
   wherein the controlled variable corresponding to the position of the control valve is determined by observing the manipulated variable and at least one further variable, influenceable by the position of the control valve, and
   wherein the controlled variable corresponding to the position of the control valve is determined by observing the manipulated variable and a pressure registered respectively upstream and downstream of the control valve.

2. The method of claim 1, wherein the control valve is part of at least one of a closed-loop and open-loop process control system.

3. The method as claimed in claim 1, wherein the reference variable is predefined by a higher-order control system.

4. The method as claimed in claim 1, wherein the reference variable is predefined by a pressure control system.

5. The method as claimed in claim 1, wherein the determined position of the control valve is indicated.

6. The method as claimed in claim 1, wherein a mass flow is proportional to the pressure registered respectively upstream and downstream of the control valve.

7. The method as claimed in claim 1, wherein a supercritical pressure drop occurs across the control valve.

8. The method as claimed in claim 1, wherein an affine control system is used.

9. The method as claimed in claim 1, wherein a value of the reference variable ranges from approximately −10% to 110%.

10. The method as claimed in claim 1, wherein the manipulated variable is led to at least one selection switch.

11. The method as claimed in claim 10, wherein the manipulated variable is switched to at least one of a maximum and a minimum value via the selection switch.

12. The method as claimed in claim 1, wherein the controlled variable is also a registered measured value from a valve position transmitter.

13. The method as claimed in claim 1, wherein a measured value from the valve position transmitter is used to calibrate an observer for observing the manipulated variable and a pressure registered respectively upstream and downstream of the control valve.

14. The method as claimed in claim 1, wherein the control valve is at least one of positioned and maintained in the position predefined by the reference variable by an electrohydraulic drive.

* * * * *